United States Patent [19]

Letoffé et al.

[11] Patent Number: 4,508,888

[45] Date of Patent: Apr. 2, 1985

[54] RAPIDLY HARDENING ORGANOPOLYSILOXANE COMPOSITIONS COMPRISING POLYACYLOXYSILANE CROSS-LINKING AGENTS

[75] Inventors: Michel Letoffé, Sainte-Foy les Lyon; Roger Favre; Patrice Perrin, both of Lyons, all of France

[73] Assignee: Rhone-Poulenc Specialites Chimiques, Courbevoie, France

[21] Appl. No.: 573,612

[22] Filed: Jan. 25, 1984

[30] Foreign Application Priority Data

Jan. 27, 1983 [FR] France ................................ 83 01505

[51] Int. Cl.$^3$ ............................................. C08G 77/06
[52] U.S. Cl. ........................................ 528/23; 528/34; 528/901
[58] Field of Search ............................ 528/23, 901, 34

[56] References Cited

FOREIGN PATENT DOCUMENTS

| 49-5612 | 2/1974 | Japan | 528/23 |
|---|---|---|---|
| 133452 | 10/1980 | Japan | 528/23 |
| 763377 | 9/1980 | U.S.S.R. | 528/23 |

*Primary Examiner*—Melvyn I. Marquis
*Attorney, Agent, or Firm*—Burns, Doane, Swecker & Mathis

[57] ABSTRACT

Organopolysiloxane compositions which rapidly harden to the elastomeric state, even at ambient temperatures, are comprised of (i) a polyhydroxylated polysiloxane, (ii) a polyacyloxysilane cross-linking agent therefor, and (iii) a hardening accelerator comprising water and an alkali or alkaline earth metal phosphate and/or polyphosphate. The subject compositions are useful, inter alia, for providing elastomeric seals.

16 Claims, No Drawings

RAPIDLY HARDENING ORGANOPOLYSILOXANE COMPOSITIONS COMPRISING POLYACYLOXYSILANE CROSS-LINKING AGENTS

BACKGROUND OF THE INVENTION

1. Field of the Invention

The present invention relates to organopolysiloxane compositions which are hardenable to elastomers at ambient temperature, and, more especially, to such compositions comprising acyloxy radicals bonded to silicon atoms and further including hardening accelerators which comprise water and an alkali or alkaline earth metal phosphate and/or polyphosphate.

The subject compositions, in contrast to the known one-component compositions also comprising acyloxy radicals bonded to silicon atoms (described, in particular, in French Pat. Nos. 1,198,749, 1,220,348 and 2,429,811, U.S. Pat. No. 3,133,891, and published French Application No. 82/13,505, filed on July 30, 1982), are not stable upon storage, but the time required for the cross-linking thereof is much shorter, for example, on the order of a few minutes up to 60 minutes. They must therefore be directly prepared as and when required.

The subject compositions are also capable of being employed in fields of application which require a short cross-linking time, regardless of the degree of humidity of the surrounding atmosphere, such as the production of an "in situ" seal in the automobile industry.

2. Description of the Prior Art

Organopolysiloxane compositions comprising acyloxy radicals bonded to silicon atoms, whose cross-linking time is independent of the humidity of the ambient air are known to this art; compare, for example, British Patent Specification No. 1,308,985. More precisely, this patent relates to a process of hardening consisting of adding to the above compositions from 3 to 15% of a sodium silico-aluminate having from 5 to 10% by weight of adsorbed water.

This prior art process makes it possible to manufacture silicone elastomer molded shaped articles by low pressure injection. However, British Patent Specification No. 1,308,985 teaches that it is necessary to attain relatively short hardening times, for example, on the order of 30 minutes, to introduce large amounts of sodium silico-aluminate (15% in the table on page 2); this has the disadvantage of impairing the mechanical properties of the elastomers produced from the compositions. Furthermore, the patent does not mention the means required to obtain cross-linking times less than 30 minutes. Cf. British Patent Specification Nos. 640,067 and 1,181,346.

Consequently, serious need exists in this art for organopolysiloxane compositions comprising acyloxy radicals bonded to silicon atoms, rapidly hardening at ambient temperature, regardless of air humidity, and still providing elastomers having good mechanical properties.

This combination of properties would make it possible, among other things, to employ such compositions for the gluing or sealing of components;

(1) moving on industrial assembly lines, or (2) for which no storage areas are available to ensure their complete hardening.

SUMMARY OF THE INVENTION

Accordingly, a major object of the present invention is the provision of an improved organopolysiloxane composition comprising acyloxy radicals bonded to silicon atoms, which improved composition has all of the aforenoted required properties.

Briefly, the subject improved organopolysiloxane compositions comprise a polyhydroxylated polysiloxane, a polyacyloxysilane and a hardening accelerator, said hardening accelerator comprising admixture of water and an alkali or alkaline earth metal phosphate and/or polyphosphate.

DETAILED DESCRIPTION OF THE INVENTION

More particularly according to the present invention, the subject organopolysiloxane compositions which cross-link to elastomers at ambient temperature, advantageously comprise at least:

(A) 100 parts of by weight polymers which are essentially $\alpha,\omega$-di(hydroxy)diorganopolysiloxanes, having a viscosity of 700 to 1,000,000 mPa·s at 25° C., each consisting of a sequence of recurring diorganosiloxy units of the formula $R_2SiO$ in which the symbols R, which may be identical or different, represent hydrocarbon radicals having from 1 to 8 carbon atoms, optionally substituted by halogen atoms or cyano groups;

(B) 2 to 20 parts by weight of cross-linking agents of the general formula:

$$R_pSi(OCOR')_{4-p}$$

in which the symbol R has the meaning given under (A), the symbol R' denotes a hydrocarbon radical free from aliphatic unsaturation, having from 1 to 15 carbon atoms, and the symbol p is zero or one;

(C) 0 to 150 parts by weight of inorganic fillers; and (D) 0.01 to 7 parts by weight, per 100 parts by weight of (A)+(B)+(C), of hardening accelerators, said accelerators (D) comprising admixtures of water, or a compound which releases or evolves water at the temperature of cross-linking (a "water donor"), and an alkali or alkaline earth metal phosphate and/or polyphosphate, the amount of water present in such admixture at cross-linking temperatures advantageously comprising at least 5% by weight of the phosphate and/or polyphosphate.

Thus, consistent herewith the accelerators (D) advantageously comprise admixtures of water with, preferably, potassium, sodium, calcium or magnesium phosphates and/or polyphosphates, whether in anhydrous or hydrated state.

When the phosphates are hydrated and comprise at least 2 molecules of water of crystallization per molecule, which separate off at a temperature below 60° C., it is ofttimes unnecessary to add any free water to constitute the intended admixture.

The polymers (A) having a viscosity of 700 to 1,000,000 mPa·s at 25° C., preferably 1,000 to 700,000 mPa·s at 25° C., are essentially linear polymers, basically consisting of diorganosiloxy units of the aforesaid formula $R_2SiO$, and blocked with a hydroxyl group at each of their chain; nevertheless, the presence of monoorganosiloxy units of the formula $RSiO_{1.5}$ and/or of siloxy units of the formula $SiO_2$ is not excluded in a proportion of at most 2% relative to the number of diorganosiloxy units.

The hydrocarbon radicals having from 1 to 8 carbon atoms, optionally substituted by halogen atoms or cyano groups and denoted by the symbols R, are advantageously:

(i) alkyl and haloalkyl radicals having from 1 to 8 carbon atoms, such as the methyl, ethyl, n-propyl, isopropyl, n-butyl, n-pentyl, n-hexyl, 2-ethylhexyl, n-octyl, 3,3,3-trifluoropropyl, 4,4,4-trifluorobutyl or 4,4,4,3,3-pentafluorobutyl radicals, (ii) cycloalkyl and halocycloalkyl radicals having from 4 to 8 carbon atoms, such as the cyclopentyl, cyclohexyl, methylcyclohexyl, 2,3-difluorocyclobutyl or 3,4-difluoro-5-methylcycloheptyl radicals, (iii) alkenyl radicals having from 2 to 4 carbon atoms, such as the vinyl, allyl or 2-butenyl radicals, aryl and haloaryl radicals having from 6 to 8 carbon atoms, such as the phenyl, tolyl, xylyl, chlorophenyl, dichlorophenyl or trichlorophenyl radicals, (iv) cyanoalkyl radicals, the alkyl moieties of which have from 2 to 3 carbon atoms, such as the β-cyanoethyl and γ-cyanopropyl radicals.

Exemplary of units denoted by the formula $R_2SiO$, the following are representative:
$(CH_3)_2SiO$
$CH_3(CH_2=CH)SiO$
$CH_3(C_6H_5)SiO$
$(C_6H_5)_2SiO$
$CF_3CH_2CH_2(CH_3)SiO$
$NC-CH_2CH_2(CH_3)SiO$
$NC-CH(CH_3)CH_2(CH_2=CH)SiO$
$NC-CH_2CH_2CH_2(C_6H_5)SiO$ It will be appreciated that, in another embodiment of the invention, it is possible to employ as polymers (A) α,ω-di(hydroxy)diorganopolysiloxane copolymers, or a mixture consisting of α,ω-di(hydroxy)diorganopolysiloxane polymers which differ from each other in molecular weight and/or the nature of the groups bonded to the silicon atoms.

Such α,ω-di(hydroxy)diorganopolysiloxane copolymers (A) are readily commercially available; moreover, they can be easily prepared. One of the most widely employed methods of preparation consists, in a first step, of polymerizing diorganocyclopolysiloxanes with the aid of catalytic amounts of alkaline or acid agents and then treating the polymerizates with calculated amounts of water (French Pat. Nos. 1,134,005, 1,198,749 and 1,226,745); this addition of water, which is inversely proportional to the viscosity of the polymers to be prepared, can be wholly or partly replaced with α,ω-di(hydroxy)diorganopolysiloxane oils of a low viscosity, for example, ranging from 5 to 200 mPa·s at 25° C., having a high proportion of hydroxyl radicals, for example, from 3 to 14%.

The cross-linking agents (B) are used in amount of 2 to 20 parts by weight, preferably of 3 to 15 parts by weight, per 100 parts by weight of the α,ω-di(hydroxy)-diorganopolysiloxane polymers (A).

They conform to the aforesaid formula:

$$R_pSi(OCOR')_{4-p}$$

in which, as heretofore mentioned, the symbol R has the meaning given under (A), the symbol R' denotes a hydrocarbon radical free from aliphatic unsaturation, having from 1 to 15 carbon atoms, and the symbol p is zero or 1.

Precise details have already been given regarding the nature of the radicals denoted by the symbol R. As for the symbol R', this denotes a radical selected from among:

(1) alkyl radicals having from 1 to 15 carbon atoms, such as the methyl, ethyl, n-propyl, n-butyl, n-pentyl, 1-ethylpentyl, n-hexyl, 2-ethylhexyl, n-octyl, neodecyl, n-decyl, n-dodecyl or n-pentadecyl radicals;

(2) cycloalkyl radicals having from 5 to 6 ring carbon atoms, such as the cyclopentyl and cyclohexyl radicals;

(3) aryl radicals having from 6 to 8 carbon atoms, such as the phenyl, tolyl or xylyl radicals.

As examples of cross-linking agents (B), representative are those corresponding to the following formulae:
$CH_3Si(OCOCH_3)_3$
$C_2H_5Si-(OCOCH_3)_3$
$CH_2=CHSi(OCOCH_3)_3$
$C_6H_5Si-(OCOCH_3)_3$
$CH_3Si[OCOCH(C_2H_5)(CH_2)_3-CH_3]_3$
$CF_3CH_2CH_2Si(OCOC_6H_5)_3$
$CH_3Si(OCOC_6H_5)_3$ $$CH_3Si(OCOCH_3)_2(OCOCH-(CH_2)_3-CH_3)\\ \quad\quad\quad\quad\quad\quad\quad\quad\quad\quad\quad | \\ \quad\quad\quad\quad\quad\quad\quad\quad\quad\quad C_2H_5$$

$$CH_3COOSi[OCOCH-(CH_2)_3CH_3]_3\\ \quad\quad\quad\quad\quad\quad | \\ \quad\quad\quad\quad\quad C_2H_5$$

It is clear that in the compositions of the invention the components (A) and (B) can be replaced with the devolatilized products emanating from the stoichiometric reaction of (A) with (B) according to the process described in French Pat. No. 1,200,348.

If a cross-linking agent (B) whose acyloxy radicals are of low molecular weight is employed, for example, methyltriacetoxysilane, there is formed, during the cross-linking, an organic acid of low molecular weight, which is generally volatile at the typical cross-linking temperatures and which is removed from the elastomer by evaporation and can then possibly be a source of corrosion phenomena and of loss of adhesion, particularly when the composition is deposited on metallic substrates. On the other hand, if use is made of a cross-linking agent (B) whose acyloxy radicals have a higher molecular weight, for example, methyltris(2-ethylhexanoyloxy)silane, 2-ethylhexanoic acid is formed, which is not volatile at the typical cross-linking temperatures and which remains in the elastomer; this represents a serious disadvantage, since the elastomer then has poor heat resistance and, in particular, a poor CS (compression set).

Furthermore, the acid remaining in the elastomer is also a source of corrosion phenomena and of loss of adhesion, particularly when the composition is deposited on metallic substrates.

One of the highly significant advantages of the use of the accelerators (D) according to the invention is precisely that, in the event same are sufficiently basic (for example, $K_3PO_4$, $Na_3PO_4$, $K_2HPO_4$, $Na_2HPO_4$, $K_4P_2O_7$, $Na_4P_2O_7$, $Na_5P_3O_{10}$, and the like), they neutralize the acids formed over the course of the cross-linking, eliminating the disadvantages inherently associated with the presence of these acids.

It is therefore particularly advantageous to use the accelerator (D) in an amount which is at least stoichiometric relative to the amount of acid which can form during the hardening of the composition.

With these cross-linking agents (B) there may be associated silanes, each of which has only two hydrolyzable groups; these silanes correspond to the formula:

$$R''_2Si(OCOR')_2$$

in which the symbols R' have the meaning of the symbol R' in the formula $$R_pSi(OCOR')_{4-p}$$

and the symbols R" have the meaning of the symbol R in this same formula, or denote a tertiary butoxy radical of the formula $(CH_3)_3C-O-$.

As examples of these silanes, representative are those of the following formulae:
$(CH_3)_2Si(OCOCH_3)_2$
$CH_2=CH(CH_3)Si(OCOCH_3)_2$
$(C_6H_5)_2Si(OCOCH_3)_2$
$[(CH_3)_3C-O]_2Si(OCOCH_3)_2$
$(CH_3)_2Si[OCOCH(C_2H_5)(CH_2)_3CH_3]_2$
$[(CH_3)_3CO]_2Si[OCOCH(C_2H_5)(CH_2)_3CH_3]_2$ The molar quantity which is employed of the silanes of the formula $$R''_2Si(OCOR')_2$$

relative to the quantity employed of the cross-linking silanes (B) of the formula $R_pSi(OCOR')_{4-p}$ is not narrowly defined, but it is necessary that it has an upper limit such that the mixture of both types of silanes always contains on average at least 2.5 —OCOR' groups per silicon atom.

Thus, when taking, for example, 1 mol of cross-linking silane (B) of the formula $RSi(OCOR')_3$ (with p=1), there must be associated with it at most 1 mol of the silane $R''_2Si(OCOR')_2$; similarly, when taking 1 mol of the cross-linking silane (B) of the formula $Si(OCOR')_4$ (with p=0), there must be associated with it at most 3 mol of silane $R''_2Si(OCOR')_2$.

The main function of the silanes of the formula $R''_2Si(OCOR')_2$ is to link the chains of the $\alpha,\omega$-di(hydroxy)diorganopolysiloxane polymers (A), which makes it possible to obtain elastomers having good physical characteristics starting from compositions containing polymers (A) whose viscosity is relatively low, for example, ranging from 700 to 5,000 mPa·s at 25° C.

The inorganic fillers (C) are employed in an amount of 0 to 150 parts by weight, preferably 5 to 120 parts by weight, per 100 parts by weight of $\alpha,\omega$-di(hydroxy)diorganopolysiloxane polymers (A). These fillers can be in the form of very finely divided particles whose mean particle diameter is less than 0.1 μm. Representative of such fillers are pyrogenic silicas and precipitated silicas; their specific surface is generally greater than 40 m²/g, and is most frequently in the range 150–200 m²/g.

These fillers can also be in the form of more coarsely divided particles, with a mean particle diameter greater than 0.1 μm. Representative of such fillers are ground quartz, diatomaceous silicas, calcium carbonate, calcined clay, rutile-type titanium oxide, the oxides of iron, zinc, chromium, zirconium or magnesium, the various forms of alumina (hydrated or not), boron nitride, lithopone or barium metaborate; their specific surface is generally below 30 m²/g.

The fillers (C) may have been surface-modified by treatment with the various organosilicon compounds conventionally employed for this application. Thus, these organosilicon compounds may be organochlorosilanes, diorganocyclopolysiloxanes, hexaorganodisiloxanes, hexaorganodisilazanes or diorganocyclopolysilazanes (French Pat. Nos. 1,126,884, 1,136,885 and 1,236,505, British Patent Specification No. 1,024,234). The modified fillers contain, in the majority of cases, from 3 to 30% of their weight of organosilicon compounds.

The fillers (C) may consist of a mixture of several types of fillers with different particle size distributions; thus, for example, they may consist of 30 to 70% of finely divided silicas having a specific surface greater than 40 m²/g and of 70 to 30% of more coarsely divided silicas having a specific surface below 30 m²/g.

The alkali and alkaline earth metal phosphates and/or polyphosphates comprising the accelerators (D) are preferably selected from among the phosphates and polyphosphates of potassium, sodium, calcium and magnesium, either in anhydrous or hydrated state. Exemplary of such compounds, the following are especially representative:

| Anhydrous compounds: | Hydrated compounds: | |
|---|---|---|
| $K_3PO_4$ | $K_3PO_4.8H_2O$ | |
| $K_2HPO_4$ | $K_2HPO_4.3H_2O-K_2HPO_4.H_2O$ | |
| $KH_2PO_4$ | $K_4P_2O_7.3.5 H_2O$ | |
| $K_4P_2O_7$ | $Na_3PO_4.8H_2O$ | |
| $Na_3PO_4$ | $Na_2HPO_4.12H_2O$ | |
| $Na_2HPO_4$ | $Na_2HPO_4.7H_2O$; | $Na_2HPO_4.2H_2O$, |
| $Na_2HPO_4$ | $Na_2HPO_4.2H_2O$; | $Na_2HPO_4.H_2O$ |
| $Na_4P_2O_7$ | $Na_4P_2O_7.10H O$ | |
| $Na_3HP_2O_7$ | $Na_3HP_2O_7.H_2O$ | |
| $Na_2H_2P_2O_7$ | $Na_2H_2P_2O_7.6H_2O$ | |
| $Na_5P_3O_{10}$ | $Na_5P_3O_{10}.6H_2O$ | |
| $CaHPO_4$ | $CaHPO_4.2H_2O$ | |
| $CaH_4(PO_4)_2$ | $CaH_4(PO_4)_2.H_2O$ | |
| $Mg_3(PO_4)_2$ | $Mg_3(PO_4)_2.8H_2O$ | |
| $MgHPO_4$ | $MgHPO_4.7H_2O$; | $MgHPO_4.3H_2O$; |
| | $MgHPO_4.H_2O$ | |

The anhydrous or hydrated phosphates and polyphosphates are used jointly with the water which is introduced; the latter is present in an amount of at least 5% by weight, preferably in an amount of at least 8% by weight, of the weight of the phosphate compounds proper (without taking into account their water of hydration, where applicable). The upper limit is not narrowly fixed; there is no advantage, however, in exceeding 200% of the weight of the phosphate compounds proper. Preferably, such amount is below 150%.

The water may be added at any time during the preparation of the compositions according to the invention; in particular, it may be mixed directly with the phosphates and/or polyphosphates or with the pastes containing them. These pastes may consist of a silicone oil, such as an $\alpha,\omega$-bis(trimethylsiloxy)dimethylpolysiloxane polymer having a variable viscosity ranging, for example, from 500 to 100,000 mPa·s at 25° C., and, if appropriate, of one or more inorganic fillers corresponding to at most 15% by weight of the oil. If care is taken, or if it is possible to heat the pastes containing the phosphates and/or polyphosphates in the hydrated state to a temperature above 100° C., for example, ranging from 110° to 180° C., for at least 30 minutes, then, very often, a part or all of the water of hydration is released. This water, dispersed in the paste, behaves like added water and further addition may therefore be found unnecessary.

The addition of water is, in particular, not essential when the phosphates and polyphosphates contain water of crystallization which can be separated off by heating to a moderate temperature. More precisely, these phosphate compounds, which can be employed without addition of water, must release or evolve at least 2 molecules of water per molecule, and preferably at least 3 molecules of water, at a temperature below or equal to 60° C.

Exemplary of such compounds, representative are those of the formulae:

$K_3PO_4.8H_2O$
$K_2HPO_4.3H_2O$
$Na_3PO_4.8H_2O$
$Na_2HPO_4.12H_2O$
$NaH_2PO_4.2H_2O$
$Na_2H_2P_2O_7.6H_2O$
$MgHPO_4.7H_2O$

The organopolysiloxane compositions according to the invention may contain, in addition to the constituents (A), (B), (C) and (D), hardening catalysts which are typically selected from among:

(i) metal salts of carboxylic acids, preferably organotin salts of carboxylic acids, such as dibutyltin diacetate and dilaurate, (ii) products of reaction of organotin salts of carboxylic acids with titanic acid esters (U.S. Pat. No. 3,409,753), (iii) organic derivatives of titanium and of zirconium, such as the titanic and zirconic acid esters (published French Application No. 82/13,505, filed July 30, 1982).

These catalysts for hardening are typically employed in a proportion from 0.0004 to 6 parts by weight, preferably from 0.0008 to 5 parts by weight, per 100 parts by weight of α,ω-di(hydroxy)diorganopolysiloxane polymers (A).

The organopolysiloxane compositions may also contain the usual adjuvants and additives, including, in particular, heat stabilizers. These latter materials, which, through their presence, improve the heat resistance of the silicone elastomers, may be selected from the salts, oxides and hydroxides of rare earths (and more especially from the ceric oxides and hydroxides) or from the oxides of titanium and of iron obtained, preferably, by combustion.

Advantageously, the compositions according to the invention contain from 0.1 to 15 parts by weight, and preferably from 0.15 to 12 parts by weight, of heat stabilizers per 100 parts by weight of α,ω-di(hydroxy)-diorganopolysiloxane polymers (A).

As other additives, exemplary are compounds improving flame resistance; these are preferably selected from among organic phosphorus derivatives, organic halogen compounds, and organic and inorganic platinum derivatives.

In addition to the main constituents (A), (B), (C) and (D) and the above-mentioned additives, particular organopolysiloxane compounds may be introduced with the intention of influencing the physical characteristics of the compositions according to the invention and/or the mechanical properties of the elastomers produced by the hardening of these compositions.

These organopolysiloxane compounds are well known; they include, more especially:

(1f) α,ω-bis(triorganosiloxy)diorganopolysiloxane and/or α-(hydroxy)-ω-(triorganosiloxy)diorganopolysiloxane polymers, having viscosities of at least 10 mPa·s at 25° C., consisting essentially of diorganosiloxy units and at most 1% of monoorganosiloxy and/or siloxy units, the organic radicals bonded to the silicon atoms comprising methyl, vinyl or phenyl radicals, at least 60% of these organic radicals being methyl radicals and at most 10% being vinyl radicals. The viscosity of these polymers may reach several tens of millions of MPa·s at 25° C.; they therefore include oils with a fluid to viscous appearance and soft to hard gums. They are prepared according to the conventional techniques described in greater detail in French Pat. Nos. 978,058, 1,025,150, 1,108,764 and 1,370,884. Preferably use is made of α,ω-bis(trimethylxiloxy)dimethylpolysiloxane oils having a viscosity ranging from 10 mPa·s to 1,000 mPa·s at 25° C. These polymers, which act as plasticizers, may be added in an amount of at most 150 parts by weight, preferably of 5 to 120 parts by weight, per 100 parts by weight of α,ω-di(hydroxy)diorganopolysiloxane polymers (A).

(2f) branched, liquid methylpolysiloxane polymers having from 1.4 to 1.9 methyl radicals per silicon atom, consisting of a combination of units of the formulae:

$(CH_3)_3SiO_{0.5}$
$(CH_3)_2SiO$ and
$CH_3SiO_{1.5}$ and containing from 0.1 to 8% of hydroxyl groups. Same can be obtained by hydrolysis of the corresponding chlorosilanes as taught by French Pat. Nos. 1,408,662 and 2,429,811. Preferably, use is made of branched polymers whose units are distributed according to the following ratios:

$$(CH_3)_3SiO_{0.5}/(CH_3)_2SiO = 0.01 \text{ to } 0.15$$

and $$CH_3SiO_{1.5}/(CH_3)_2SiO = 0.1 \text{ to } 1.5.$$

These polymers may be added in an amount of at most 70 parts by weight, preferably of 3 to 50 parts by weight, per 100 parts by weight of α,ω-di(hydroxy)diorganopolysiloxane polymers (A). They confer thixotropic properties, particularly with the modified silicas.

(3f) diorganopolysiloxane oils blocked with hydroxyl groups and/or lower alkoxy groups having from 1 to 4 carbon atoms, having a low viscosity generally in the range 2 mPa·s to 4,000 mPa·s at 25° C. (if these oils are blocked only with hydroxyl groups, their viscosity is below 700 mPa·s at 25° C.); the organic radicals bonded to the silicon atoms of these oils are, as before, selected from among the methyl, vinyl or phenyl radicals, at least 40% of these radicals being methyl radicals and at most 10% being vinyl radicals. As chain-blocking lower alkoxy groups, exemplary are the methoxy, ethoxy, isopropoxy, n-propoxy, n-butoxy, isobutoxy and tertiary butoxy groups. The contents of hydroxyl and/or alkoxy groups generally range from 0.5 to 20%. These oils are prepared according to conventional techniques described in greater detail in French Pat. Nos. 938,292, 1,104,674, 1,116,196, 1,278,281 and 1,276,619. Preferably, α,ω-dihydroxydimethylpolysiloxane oils are used, having a viscosity of 10 to 300 mPa·s at 25° C., or α,ω-dihydroxymethylphenylpolysiloxane oils are used, having a viscosity of 200 to 600 mPa·s at 25° C., or α,ω-dimethoxy(or diethoxy)dimethylpolysiloxane oils are used, having a viscosity of 30 to 2,000 mPa·s at 25° C. They may be added in a proportion of at most 50 parts by weight, preferably of 2 to 40 parts by weight, per 100 parts by weight of α,ω-di(hydroxy)diorganopolysiloxane polymers (A). These oils make it possible to reduce the overall viscosity and are considered, according to the conventional term, as process aids.

(4f) hydroxylated organosilicon compounds selected from among compounds corresponding to the general formula:

$$Z'SiZ_2(OSiZ_2)_wOH,$$

which are solid at ambient temperature. In this formula, the symbols Z, which may be identical or different, denote methyl, ethyl, n-propyl, vinyl or phenyl radicals; the symbol Z' denotes a hydroxyl radical or Z, and the symbol w is zero, 1 or 2. As specific examples of these compounds, representative are: diphenylsilanediol, methylphenylsilanediol, dimethylphenylsilanol, 1,1,3,3-tetramethyldisiloxanediol, 1,3-dimethyl-1,3-diphenyldisiloxanediol or 1,1,5,5-tetramethyl-3,3-diphenyltrisiloxanediol. They may be added in a proportion of at most 30 parts by weight, preferably 0.5 to 20 parts by weight, per 100 parts by weight of $\alpha,\omega$-di(hydroxy)diorganopolysiloxane polymers (A). Same confer thixotropic properties on the medium, which generally is slightly gelled by their action. The $\alpha,\omega$-bis(triorganosiloxy)diorganopolysiloxane and/or $\alpha$-(hydroxy)-$\omega$-(triorganosiloxy)diorganopolysiloxane polymers described under (1f) may be replaced, wholly or partially, with organic compounds which are unreactive towards the constituents (A), (B), (C) and (D) and which are miscible at least with the $\alpha,\omega$-di(hydroxy)diorganopolysiloxane polymers (A). Exemplary of such organic compounds, representative are the polyalkylbenzenes obtained by alkylation of benzene with long-chain olefins, particularly olefins with 12 carbon atoms emanating from the polymerization of propylene. Organic compounds of this type appear, for example, in French Pat. Nos. 2,392,476 and 2,446,849.

The compositions according to the invention may, if appropriate, be used after dilution with liquid organic compounds, the diluents preferably being conventional commercially available materials selected from among:

(i) optionally halogenated, aliphatic, cycloaliphatic or aromatic hydrocarbons, such as n-heptane, n-octane, cyclohexane, methylcyclohexane, toluene, xylene, mesitylene, cumene, tetralin, perchloroethylene, trichloroethane, tetrachloroethane, chlorobenzene or ortho-dichlorobenzene;

(ii) aliphatic and cycloaliphatic ketones, such as methyl ethyl ketone, methyl isobutyl ketone, cyclohexanone or isophorone;

(iii) esters, such as ethyl acetate, butyl acetate or ethylglycol acetate.

The amount of diluent is generally of little significance, generally being below 50%.

The preparation of the compositions according to the invention can take place in a single step, by mixing in a suitable reactor the combination of the components (A), (B), (C) and (D) and, if appropriate, the above-mentioned additives and adjuvants. These compounds may be added to the reactor in any order but it is, nevertheless, preferable to add the accelerators (D) after adding all of the other compounds such as to avoid a premature hardening of the mixture.

The preparation of the compositions can also take place in 2 steps. According to this technique, which is another object of the present invention, one-component compositions are first prepared by mixing, in the absence of moisture, the constituents (A), (B) and (C) and, if appropriate, the conventional additives and adjuvants. Same are stable on storage and harden only on exposure to moist air. Naturally, such compositions could, if appropriate, be employed alone and their hardening or cross-linking would then develop commencing from the surfaces in contact with the surrounding air and proceed progressively towards the interior of the mixture. The time for their complete hardening would be relatively long and would depend chiefly on the thickness of the deposited layers and on the humidity of the atmosphere surrounding the compositions. Generally, a period of 24 hours would thus be required at ambient temperature, with a humidity of 60%, to cross-link properly a layer 4 mm in thickness.

In a second step, the hardening accelerators (D) are added to these one-component compositions, and homogenized therewith, at the time of use. The compositions obtained, according to the invention, must be used quickly, since their hardening, in contrast to that of one-component compositions, develops essentially uniformly throughout the mixture. The time for their complete hardening is very variable, given that it depends on the nature and on the quantities of the accelerators (D) employed, on the presence or absence of water and on the form in which this water is introduced. By varying these various parameters it is possible to obtain hardening times ranging from a few minutes to 60 minutes or longer. The temperature is also an important parameter; in fact, variations in the temperature level have a very marked effect on the rate of hardening. If the temperature increases (the variations are positive) the hardening time is shortened; in the reverse case, such time is lengthened.

Thus, reductions in hardening time of one half, and sometimes much more, may be obtained by exposing the compositions to temperatures ranging, for example, from 50° to 200° C. instead of maintaining them at ambient temperature, namely, in the range of 15°–25° C.

Another object of the present invention is the use of the compositions with rapid hardening to produce seals.

The compositions according to the invention may be employed for many applications such as sealing in the building industry, the assembly of the most diverse materials (metals, plastics, natural and synthetic rubbers, wood, cardboard, crockery, brick, ceramics, glass, stone, concrete, masonry components), the insulation of electrical conductors, the coating of electronic circuits, or the preparation of molds employed in the manufacture of objects from synthetic resins or foams.

Furthermore, they are more especially suitable for the production of "in situ" seals employed in the automobile industry. These "in situ" seals encompass several types, namely, "crushed" seals, "formed" seals and "injected" seals.

The "crushed" seals are formed following the application of a pasty ribbon of the compositions to the zone of contact between 2 metal components to be assembled. The pasty ribbon is first deposited on one of the components and then the other component is immediately applied to the first; this results in a crushing of the ribbon before it is converted into elastomer. This type of seal is applicable to assemblies which usually do not need to be taken apart (oil sump seals, engine front end cover seals, etc.).

The "formed" seals are also obtained following the application of a pasty ribbon of the compositions to the zone of contact between 2 components to be assembled. However, after the deposition of the pasty ribbon on one of the components it is necessary to wait for the complete hardening of the ribbon to elastomer and the second component is applied to the first only after this time. As a result such an assembly can be easily taken apart since the component which is applied to that which has received the seal does not adhere to this seal. Furthermore, the seal, by virtue of its rubbery nature, adapts to all the irregularities of the surfaces to be sealed and, for this reason, there is no need (1) to machine carefully the metal surfaces which are to be placed in contact with each other and (2) to clamp under pressure the assemblies which are obtained; these factors make it possible to eliminate, to some extent, fixing seals, spacers, or ribs which are usually intended to stiffen and strengthen the components of the assemblies.

Since the compositions according to the invention harden quickly at ambient temperature, in the presence or the absence of moisture, in an enclosed environment or in free air, it follows that the "formed" seals (and also the other "in situ" seals) resulting from the hardening of these compositions can be produced under highly restricting conditions. They may, for example, be produced on the conventional assembly lines in the automobile industry which are equipped with an automatic apparatus for depositing the compositions. This automatic apparatus very frequently has a mixer head equipped with a deposition nozzle, the latter moving along the outline of the seals to be produced. The mixing head can receive the one-component polysiloxane composition and the accelerator, and can also have a third inlet allowing the introduction of a solvent for washing the equipment after use (cyclohexane, etc.).

The compositions produced and distributed by means of this apparatus must have a closely controlled hardening time, on the one hand to avoid solidification in the mixer head and on the other hand to obtain a complete cross-linking after the application of the pasty ribbon to the parts to be sealed. These "formed" seals are more especially suitable for the seals of rocker covers, gear-box covers, timing covers and even oil sumps, etc.

The injected seals are formed in an enclosed environment, often in cavities which are completely closed; the compositions placed in these cavities are rapidly converted into elastomers whose properties are identical to those of elastomers resulting from hardening of the compositions in free air. These seals can ensure, for example, the sealing of crankshaft bearings.

The compositions according to the invention are also suitable for the production of quick-hardening seals in areas other than automotive. They can thus serve to glue and to seal electrical switch boxes made of plastic, and to produce seals for vacuum cleaners and for steam irons.

The elastomers formed by the hardening of the compositions according to the invention have mechanical properties which are identical to those of elastomers produced from known one-component compositions, namely, the compositions formed by simple mixing of the constituents (A), (B) and (C) and, if appropriate, of conventional additives without the addition of accelerators (D). In particular, the compression sets are relatively low, for example, on the order of 8 to 35%; furthermore, the complete cross-linking measured by the Shore A hardness is obtained immediately following the cross-linking times mentioned earlier, which generally last from a few minutes to 60 minutes, sometimes longer but never more than 3 hours. In the case of one-component compositions, the complete cross-linking requires, under the most favorable of conditions, at least 10 hours or thereabouts. Furthermore, straightforward addition of water to the one-component compositions, while accelerating the hardening process appreciably, does not permit same to be cross-linked properly; in general, the final Shore A hardness is from 15 to 40% lower than that obtained without water or with the accelerator (D).

In order to further illustrate the present invention and the advantages thereof, the following specific examples are given, it being understood that same are intended only as illustrative and in nowise limitative.

EXAMPLES

A composition $C_2$ which hardens into an elastomer at ambient temperature was prepared by mixing the following components:

(1) 100 parts by weight of an $\alpha,\omega$-di(hydroxy)dimethylpolysiloxane oil having a viscosity of 7,000 mPa·s at 25° C.;

(2) 10 parts by weight of a pyrogenic silica having a specific surface of 150 m$^2$/g;

(3) 85 parts by weight of a diatomaceous silica having a mean particle diameter of 5 microns;

(4) 4 parts by weight of an $\alpha,\omega$-di(hydroxy)dimethylpolysiloxane oil having a viscosity of 50 mPa·s at 25° C.;

(5) 5 parts by weight of methyltriacetoxysilane; and (6) 0.004 part by weight of butyl titanate.

This composition was stored in a moistureproof container. It displayed no signs of change after 1 year's storage.

In addition, 4 pastes $B_1$, $B_2$, $B_3$ and $B_4$ were prepared, each containing a hardening accelerator for the composition $C_2$. Each paste consisted of a mixture of:

(i) 100 parts by weight of an $\alpha,\omega$-bis(trimethylsiloxy)-dimethylpolysiloxane oil having a viscosity of 30,000 mPa·s at 25° C.;

(ii) 2 parts by weight of a pyrogenic silica having a specific surface of 200 m$^2$/g; and (iii) 20.4 parts by weight of a sodium phosphate (except for $B_4$) as a hardening accelerator. The structure of the sodium phosphate is reported in detail below:

Paste $B_1$

A phosphate of the formula $Na_2HPO_4.12H_2O$ was used; the 20.4 parts decompose into 8.09 parts of $Na_2HPO_4$ and 12.31 parts of water of crystallization. This phosphate evolves 5 mol of water when heated to a temperature not exceeding 35° C., or 5.13 parts of water out of the 12.31 parts of water of crystallization.

Paste $B_2$

A phosphate of the formula $Na_3PO_4.8H_2O$; the 20.4 parts decompose into 10.8 parts of $Na_3PO_4$ and 9.6 parts of water of crystallization. This phosphate evolves 2 mol of water when heated to a temperature not exceeding 60° C., or 2.4 parts of water out of the 9.6 parts of water of crystallization.

Paste $B_3$

An anhydrous phosphate of the formula $Na_2HPO_4$ was employed. The 20.4 parts comprise 14.6 parts of the anhydrous phosphate and 5.8 parts of water added during the preparation of the paste $B_3$; the amount of added water represents 40% of the amount of the phosphate used.

Paste B4

No phosphate was used; the 20.4 parts decompose into 5.8 parts of added water and 14.6 parts of the α,ω-bis(trimethylsiloxy)dimethylpolysiloxane oil having a viscosity of 30,000 mPa·s at 25° C. This paste was used for purposes of comparison.

100 parts of the composition $C_2$ were intimately admixed over a period of 2 minutes with 5 parts of one of the above pastes. 4 different compositions were thus prepared and each was spread out, immediately following their preparation, in contact with the surrounding air, into a layer of thickness 4 mm on polyethylene plates. The composition $C_2$ was similarly spread out in contact with the surrounding air on polyethylene plates (temperature 22° C., relative humidity 65%). The deposited layers hardened and were converted into rubbery strips whose Shore A hardness was measured as a function of time.

The results are reported in the following Table; the Table also reports the amount of the accelerator added, as % of the composition $C_2$.

TABLE

|  | Composition $C_2$ | Composition $C_2$ + Paste $B_1$ | Composition $C_2$ + Paste $B_2$ | Composition $C_2$ + Paste $B_3$ | Composition $C_2$ + Paste $B_4$ |
|---|---|---|---|---|---|
| Amount of phosphate (1) in % of the composition $C_2$ | 0 | 0.33 | 0.44 | 0.59 | 0 |
| Hardness after hardening Time |  |  |  |  |  |
| 5 min | (2) not measurable | 30 | 15 | 10 | 5 |
| 10 min | not measurable | 35 | 20 | 15 | 10 |
| 30 min | not measurable | 45 | 35 | 30 | 25 |
| 60 min | not measurable | 50 | 45 | 45 | 30 |

(1) In the calculation, account was taken only of the amount of phosphate proper or anhydrous phosphate present in each paste (without taking into account any water of crystallization which may be present).

(2) Approximately 14 hours were required to obtain a Shore A hardness of 10, and 36 hours to obtain a shore A hardness of 50.

The results reported in the Table evidence that the hydrated sodium phosphates (pastes $B_1$ and $B_2$), which evolve water of hydration at a temperature below 60° C., were active as hardening accelerators; the same applies to the anhydrous sodium phosphates (paste $B_3$) mixed with water. Water by itself also accelerates the hardening but does not permit a suitable Shore A hardness to be obtained quickly (paste $B_4$).

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. An organopolysiloxane composition of matter, comprising (i) a polyhydroxylated polysiloxane, (ii) a polyacyloxysilane cross-linking agent therefor, and (iii) a hardening accelerator which comprises admixture of water or water donor and an alkali or alkaline earth metal phosphate, polyphosphate, or mixture thereof.

2. The organopolysiloxane composition as defined by claim 1, comprising (A) 100 parts by weight of essentially α,ω-di(hydroxy)diorganopolysiloxane polymers having a viscosity of 700 to 1,000,000 mPa·s at 25° C., and which polymers comprise recurring diorganosiloxy units of the formula $R_2SiO$, in which the symbols R, which may be identical or different, are hydrocarbon radicals having from 1 to 8 carbon atoms, or halo or cyano substituted such radicals; (B) 2 to 20 parts by weight of a cross-linking agent of the general formula $R_pSi(OCOR')_{4-p}$, in which R is as defined above, R' is a hydrocarbon radical devoid of aliphatic unsaturation and having from 1 to 15 carbon atoms, and p is zero or one; (C) 0 to 150 parts by weight of inorganic filler material; and (D) 0.01 to 7 parts by weight, per 100 parts by weight of (A)+(B)+(C), of a hardening accelerator which comprises admixture of water or water donor and an alkali or alkaline earth metal phosphate, polyphosphate, or mixture thereof, the amount of water present in said admixture being such that, upon crosslinking of the composition, the water comprises at least 5% by weight of said phosphate, polyphosphate, or mixture thereof.

3. The organopolysiloxane composition as defined by claim 2, said hardening accelerator (D) comprising a potassium, sodium, calcium or magnesium phosphate, polyphosphate, or mixture thereof.

4. The organopolysiloxane composition as defined by claim 2, wherein said water comprises from 5 to 200% by weight of said phosphate, polyphosphate, or mixture thereof.

5. The organopolysiloxane composition as defined by claim 2, in which the radicals R bonded to the silicon atoms of the polyhydroxylated organopolysiloxane are alkyl or haloalkyl radicals having from 1 to 8 carbon atoms, cycloalkyl or halocycloalkyl radicals having from 4 to 8 carbon atoms, alkenyl radicals having from 2 to 4 carbon atoms, aryl and haloaryl radicals having from 6 to 8 carbon atoms, or cyanoalkyl radicals, the alkyl moieties of which having from 2 to 3 carbon atoms.

6. The organopolysiloxane composition as defined by claim 2, wherein the polyacyloxysilane, p ranges from zero to 1, and the radicals R' are alkyl radicals having from 1 to 15 carbon atoms, cycloalkyl radicals having from 5 to 6 ring carbon atoms, or aryl radicals having from 6 to 8 carbon atoms.

7. The organopolysiloxane composition as defined by claim 2, comprising a basicity stoichiometric amount of the hardening accelerator (D) relative to the amount of acid adapted to be formed during the hardening thereof.

8. The organopolysiloxane composition as defined by claim 2, the components (A) and (B) comprising the devolatilized reaction product resulting from the stoichiometric reaction therebetween.

9. The organopolysiloxane composition as defined by claim 2, comprising from 5 to 120 parts by weight of the inorganic filler material (C).

10. The organopolysiloxane composition as defined by claim 2, further comprising a hardening catalyst, adjuvant, additive, or combination thereof.

11. The organopolysiloxane composition as defined by claim 1, in elastomeric, hardened, cross-linked state.

12. The organopolysiloxane composition as defined by claim 2, in elastomeric, hardened, cross-linked state.

13. A shaped article comprising the elastomeric organopolysiloxane as defined by claim 11.

14. A shaped article comprising the elastomeric organopolysiloxane as defined by claim 12.

15. A seal comprising the elastomeric organopolysiloxane as defined by claim 11.

16. A seal comprising the elastomeric organopolysiloxane as defined by claim 12.

* * * * *